United States Patent [19]

Brown

[11] Patent Number: 4,483,011
[45] Date of Patent: Nov. 13, 1984

[54] NARROW BAND TELEVISION TRANSMISSION SYSTEM

[75] Inventor: Daniel P. Brown, Elmhurst, Ill.

[73] Assignee: Motorola, Inc., Schaumburg, Ill.

[21] Appl. No.: 603,991

[22] Filed: Apr. 26, 1984

Related U.S. Application Data

[60] Continuation of Ser. No. 346,976, Feb. 8, 1982, abandoned, which is a division of Ser. No. 83,431, Oct. 10, 1979, Pat. No. 4,317,130.

[51] Int. Cl.³ .......................................... H04L 17/00
[52] U.S. Cl. ...................................... 375/25; 375/96; 375/114; 340/825.44; 358/148
[58] Field of Search .................... 375/25, 96, 110, 114, 375/115, 117; 370/19, 48, 49, 92, 107; 340/825.07, 825.21, 825.76, 825.44; 358/148

[56] References Cited

U.S. PATENT DOCUMENTS

| 3,432,619 | 3/1969 | Blasbalg | 375/96 X |
| 3,646,272 | 2/1972 | Kay | 370/107 |
| 3,697,959 | 10/1972 | Abramson et al. | 370/92 X |
| 3,854,011 | 12/1974 | Mallory et al. | 370/107 |
| 4,290,143 | 9/1981 | Wissel et al. | 375/25 X |

Primary Examiner—Jin F. Ng
Assistant Examiner—Albert W. Watkins
Attorney, Agent, or Firm—James S. Pristelski; James W. Gillman; Edward M. Roney

[57] ABSTRACT

A television transmission system for asynchronously transmitting a television picture as a plurality of video samples over a narrow bandwidth medium from at least one remote transmitting site to a receiver at a base station. Improved synchronization between the transmitter and receiver are achieved by a dotting pattern consisting of alternating logic ones and zeros being sent by the transmitter to precede the video samples such that a sampling clock at the receiver synchronizes to the phase of the dotting pattern and thereafter samples the video signal. The video signals are also preceded by at least one predetermined digital word which identifies the particular remote transmitter and prepares the receiver to begin receiving the video samples. DC restoration circuitry determines the average value of the incoming video signals and to add an appropriate DC offset to the video signals to correct for any change in the gray scale of the video samples. A Barker word detector accurately points to the first video sample of the transmitted signal.

3 Claims, 10 Drawing Figures

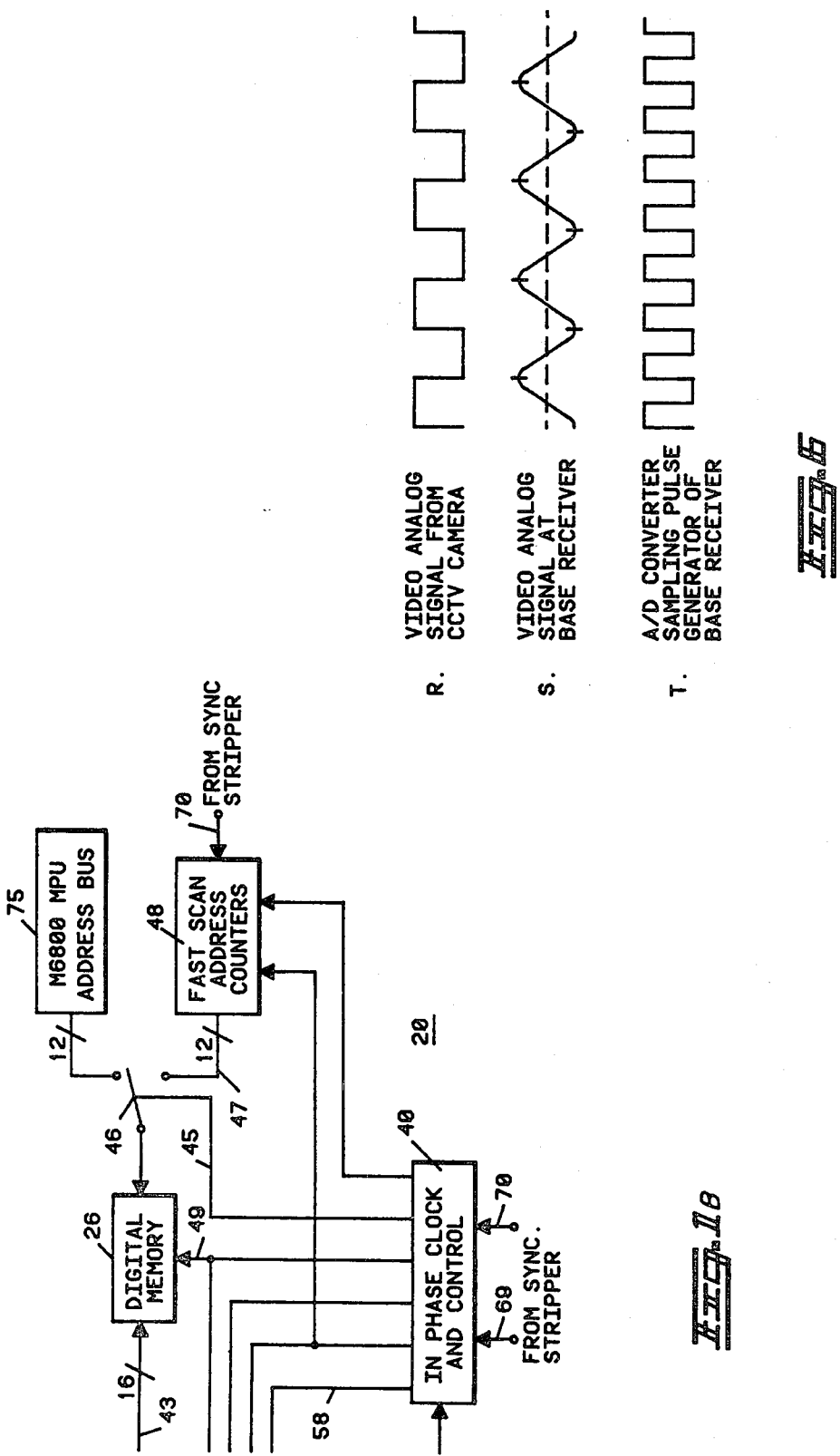

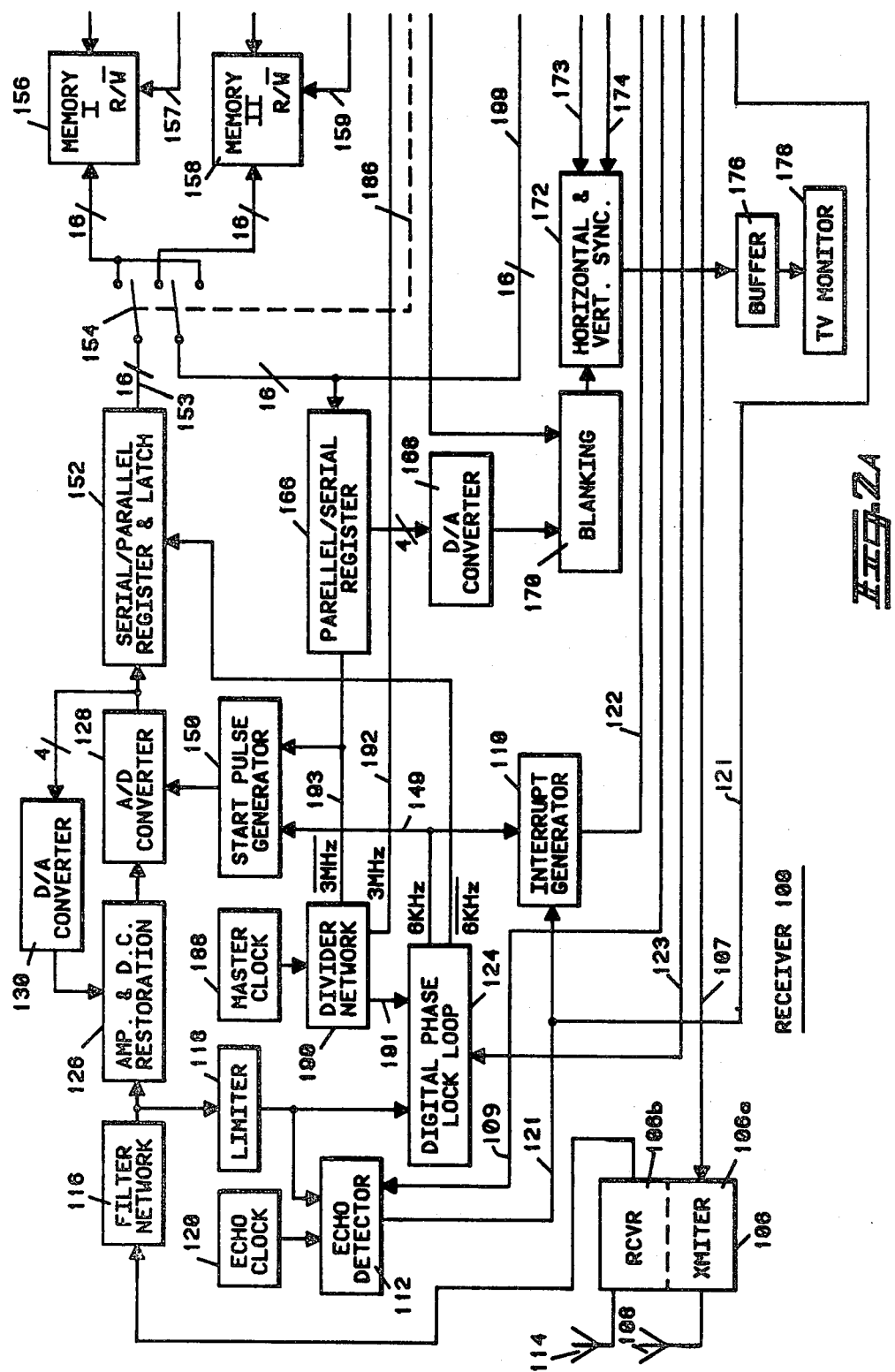

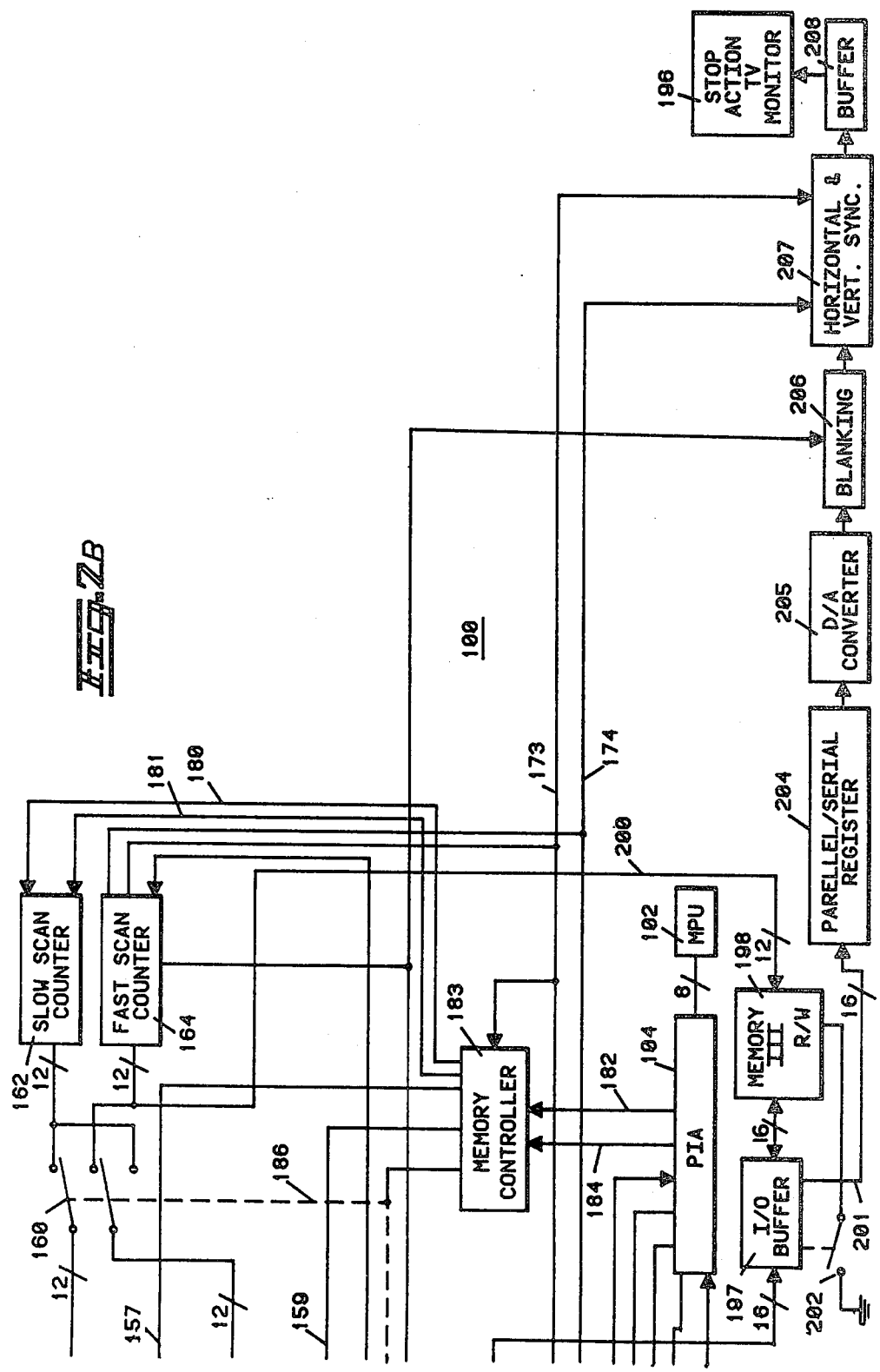

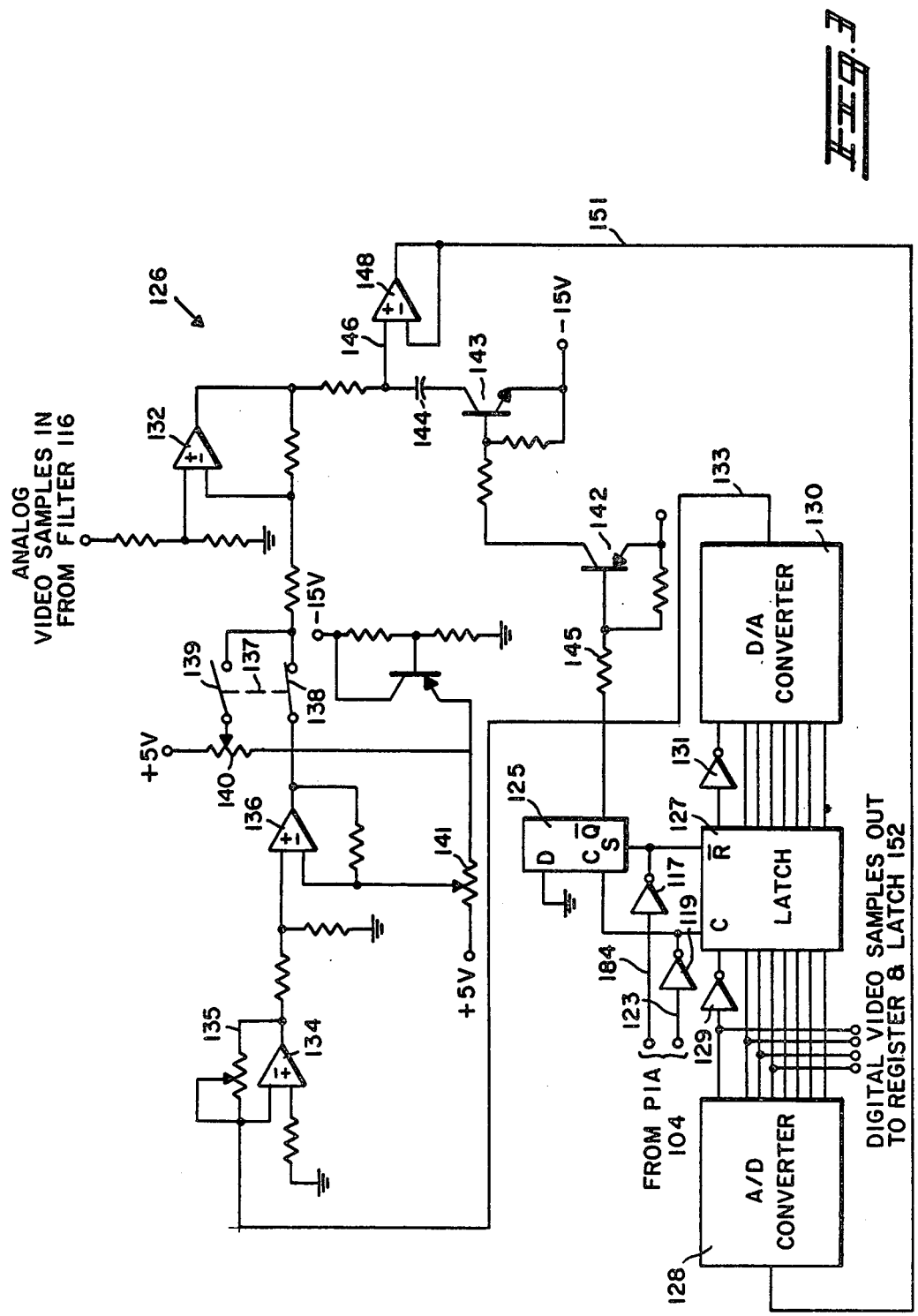

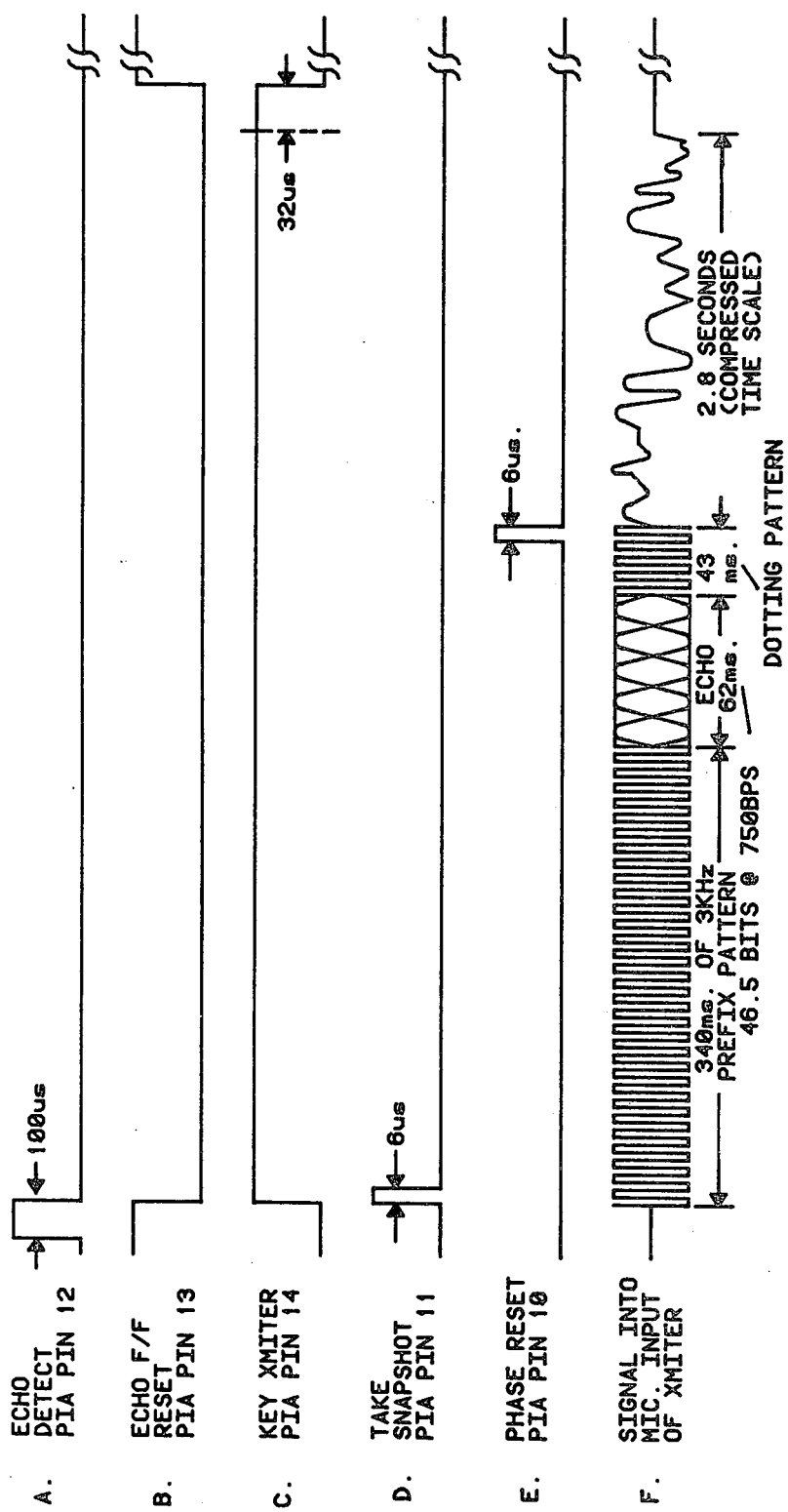

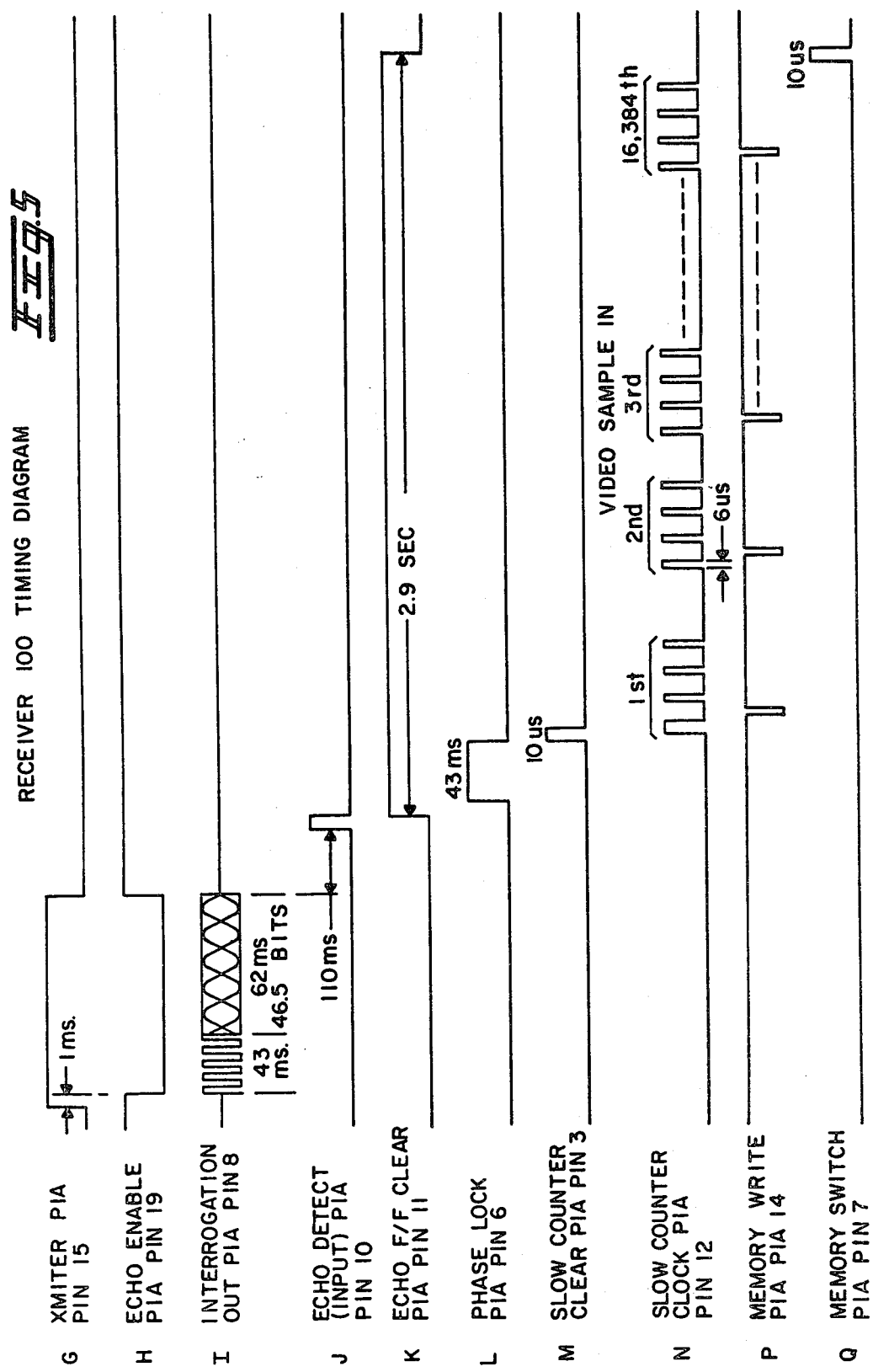

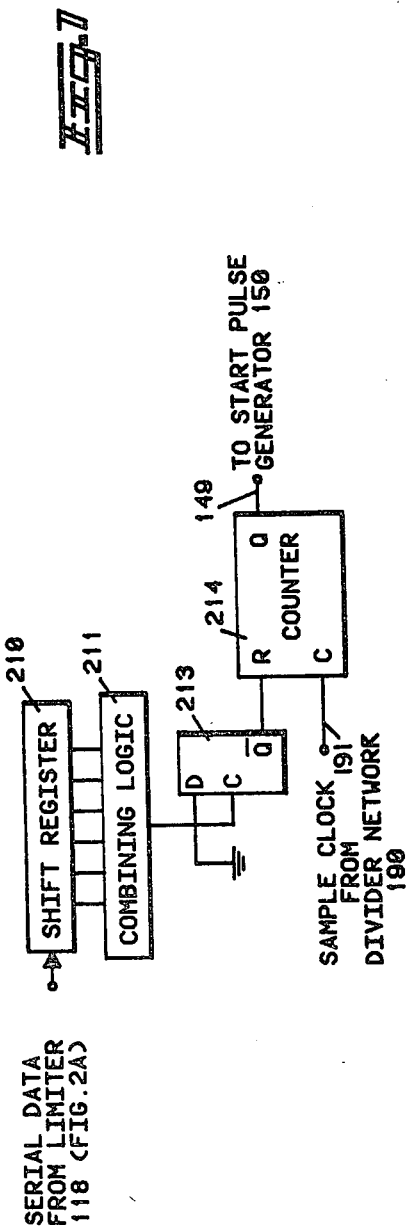
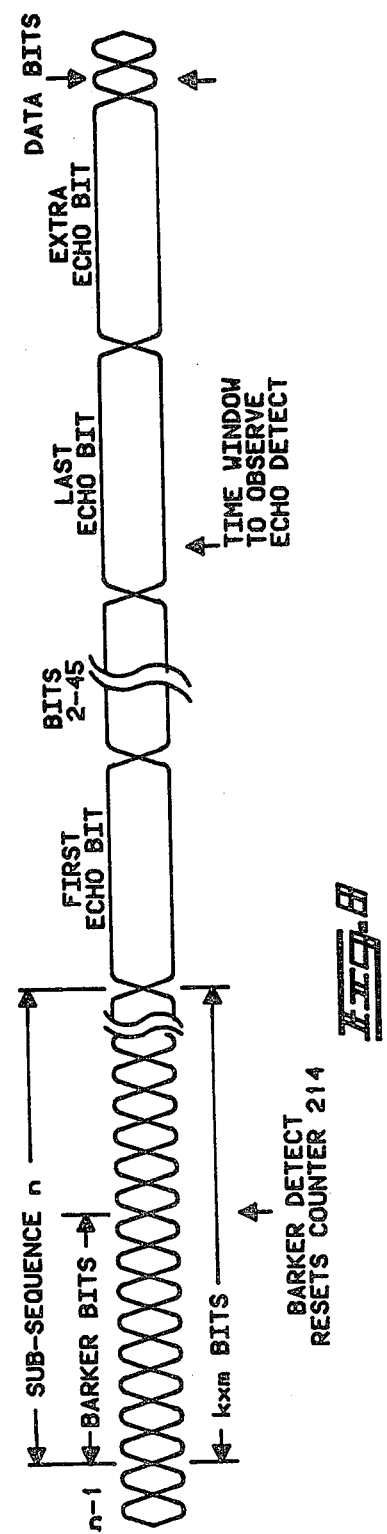

NARROW BAND TELEVISION TRANSMISSION SYSTEM

This is a continuation of application Ser. No. 346,976, filed Feb. 8, 1982, abandoned, which is a division of application Ser. No. 83,431, filed Oct. 10, 1979, now U.S. Pat. No. 4,317,130.

BACKGROUND OF THE INVENTION

This invention relates in general to a television system for transmitting pictures from a transmitter to a receiver and, more particularly, to such a television transmission system which asynchronously and sequentially transmits television pictures as a plurality of video signals over a narrow bandwidth medium with improved synchronization of the receiver to the transmitter, identification of the transmitter, identification of the start of video information, and restoration of the gray scale of the received picture.

Transmission and reception of good quality television pictures by commercial television stations is now a commonplace phenomena. However, to achieve a good quality picture having flicker-free movement and a satisfactory number of gray levels requires a substantial bandwidth for transmission of the video signals between the transmitter and receiver, for example, generally at least a few megahertz.

Many applications exist wherein it is not necessary to update the picture information numerous times each second to provide flicker-free movement. That is, updating of the picture once every couple or few seconds may be sufficient. This slower rate of television picture transmission is suitable, for example, in applications such as surveillance of public and commercial buildings, and in mass transit vehicles. This slower television picture display rate may also be adequate in remote monitoring of automobile traffic or in many industrial processes. Transmission of scenes of accidents or crime, as by law enforcement officers, may also take advantage of narrow band television systems. It will be readily understood that in many of these instances that due to the remoteness of the information site, or due to location of the transmitter on moving vehicles or the like, that it may not be possible or practical to have a closed circuit television system because of the difficulty in providing a suitable cable or other link between the transmitter and receiver or in obtaining the necessary bandwidth in the available frequency spectrum.

In recent years, some television systems have been introduced into the marketplace and others have been proposed which utilize narrow bandwidth transmission mediums, such as telephone lines, to transmit television pictures. Some of these systems have been named "slow scan" television. This is often a misnomer inasmuch as the scanning rate of the television set is not itself generally modified. The television set continues to scan at its normal scan rate of typically 15,750 lines per second. What is different is that, since the picture information is being transmitted more slowly, the picture frames are being updated and changed at a slower rate in contrast to the typical 30 picture frames per second that occur with the familiar flickerfree image obtained from commercial television stations.

Many of these narrow band television systems have not dealt with the problems of transmitting a good quality picture over a standard two-way FM radio having a bandwidth of about 3 kHz. Furthermore, many of the narrow band TV systems have been concerned with receiving picture or video signals from only a single transmitter such that identification of the particular transmitter or requesting a picture from one of a plurality of transmitters has also not been of concern. Where information from remote transmitters is asynchronously sent to a receiver, serious synchronization problems between the transmitter and receiver also occur due to the asynchronous nature of the transmissions and also due to the fact that the transmitters will generally be located at varying distances from the receiver which results in different signal phase shifts. It is also well known to those skilled in the art that signal fading occurs due to multipath propagation of transmitted FM signals, especially when the transmitter or receiver are in motion, as in various types of mobile vehicles. Oscillator instabilities in the receiver or transmitter can also cause frequency drifts. Any frequency drift between the transmitter and receiver can result in DC offset of the demodulated FM signal. Where the demodulated FM signal is a video signal to be recovered as a television picture, the DC offset results in a shift in the gray scales in the recovered TV picture which is, of course, undesirable.

SUMMARY OF THE INVENTION

It is therefore a general object of the present invention to provide a narrow band television transmission system for asynchronously transmitting a television picture as a plurality of video signals over a narrow bandwidth medium, such as a standard FM two-way radio channel, while maintaining good television picture quality at the receiver with a minimum transmission time between picture frames.

A related object of the present invention is to provide a dotting pattern consisting of alternating logic ones and zeros generated by the transmitter to precede the video signals such that a sampling clock at the receiver may become synchronized in phase to the dotting pattern before beginning sampling of the video signals.

Another object of the present invention is to provide at least one predetermined digital word with the video signals from the transmitter such that the receiver can identify which one of a plurality of transmitters is sending the television picture, and such that the receiver may initiate a television picture request to any one of the plurality of transmitters.

Yet another object of the present invention is to provide means of restoring the DC level of the received video signals which may be DC shifted due to any frequency offset or drift between the transmitter and receiver, which would otherwise affect the gray scale of the reconstructed television picture at the receiver.

Briefly, in accordance with the present invention, a television transmission system asynchronously transmits a television picture as a plurality of video signals over a narrow bandwidth medium, such as a standard FM two-way radio, from a transmitter at a remote and possibly mobile transmitting site to a receiver at a receiving or base site. A dotting pattern consisting of alternating logic ones and zeros is sent by the transmitter to precede the video signals such that a sampling clock at the receiver is first phase synchronized to the dotting pattern and thereafter begins sampling of the video signals in the desired phase. The sampling clock is preferably part of a phase-locked loop which becomes locked to the phase of the dotting pattern and thereafter maintains the desired phase relationship to the video signals. The transmitter also transmits at least one predetermined digital word which is decodable by the receiver such that the receiver may determine which one of a plurality of transmitters is sending information and such that the receiver may prepare for reception of the video signals. The receiver also transmits similar predetermined digital words to one of a plurality of transmitters to initiate a request for a television picture from the interrogated transmitter. The receiver also includes DC restoration means for restoring any DC offset in the received and demodulated signals from the transmitter due to any frequency drift between the transmitter and receiver such that the gray scale of the received video signals is automatically corrected.

BRIEF DESCRIPTION OF THE DRAWINGS

FIG. 1B is the remainder of the block diagram of the narrow band TV transmitter and FIG. 1B may be aligned with FIG. 1A to show the complete transmitter.

FIG. 2A is a block diagram of part of the narrow band TV receiver of the present invention.

FIG. 2B is a block diagram of the remainder of the narrow band TV receiver and FIG. 2B may be aligned with the block diagram of FIG. 2A to illustrate the receiver in its entirety.

FIG. 3 is a schematic diagram of the DC restoration circuit which restores the DC level of the demodulated FM signal from the narrow band TV transmitter to correct for any frequency drift or offset between the transmitter and receiver.

FIG. 4 is a timing diagram of signals present in the transmitter of FIGS. 1A and 1B.

FIG. 5 is a timing diagram of signals present in the receiver of FIGS. 2A and 2B.

FIG. 6 is a timing diagram of the sampling of a video signal which alternately changes between gray levels in successive pixels at the receiver to illustrate the effectiveness of the dotting pattern in determining the sample points.

FIG. 7 is a block diagram of a Barker word detector useable in the receiver of FIG. 2A to obtain an improved time reference for the start of the video signals, especially in noisy environments.

FIG. 8 is a signal diagram showing Barker work preambles preceding ECHO and video data in a received signal from the transmitter of FIGS. 1A and 1B.

DETAILED DESCRIPTION OF THE PREFERRED EMBODIMENT

Figure 1A:
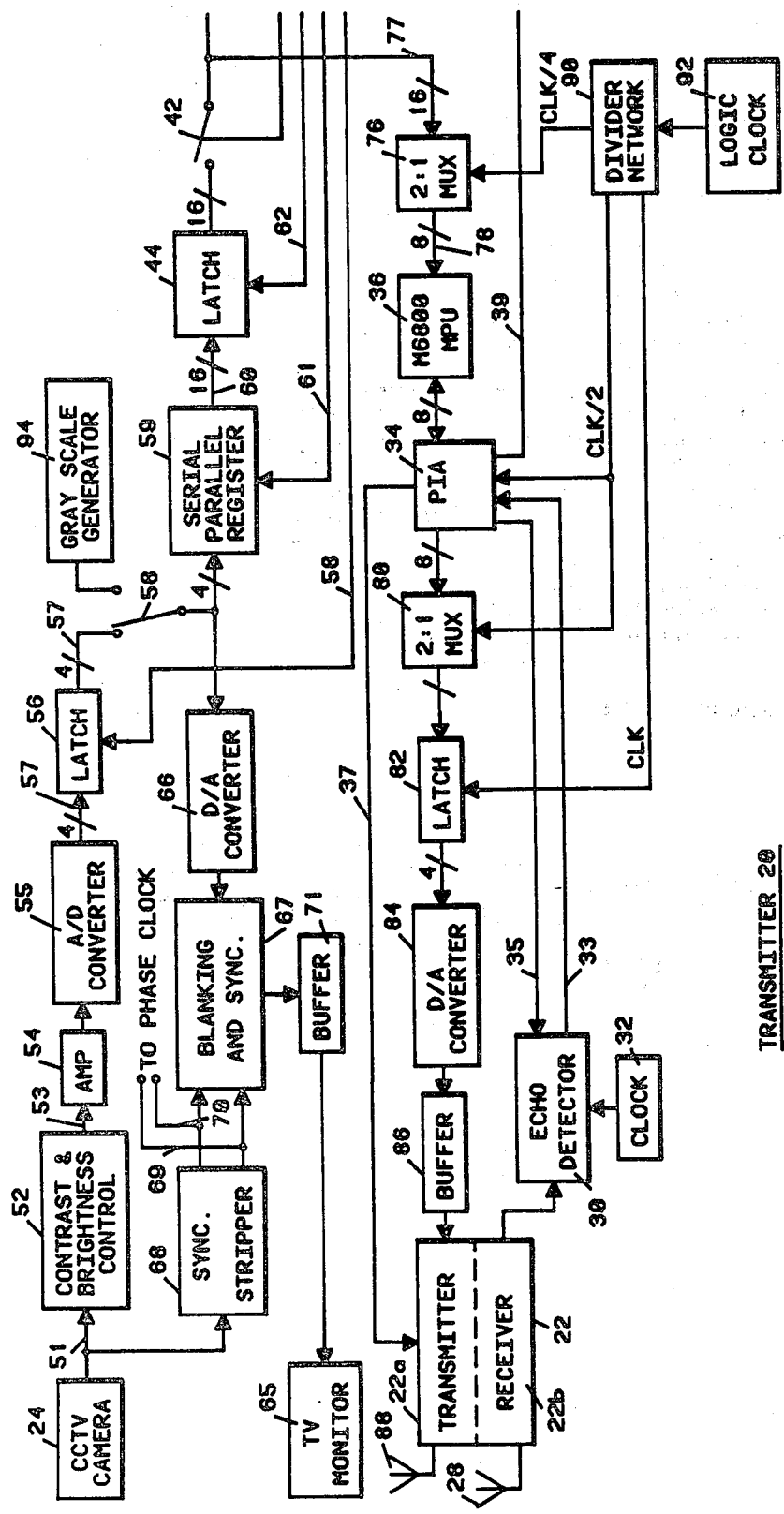
FIG. 1A is a block diagram of part of the narrow band TV transmitter of the present invention.

With reference to FIGS. 1A and 1B, there is shown a transmitter, generally designated 20, comprising part of a narrow band television system for transmitting a television television picture over a narrow bandwidth medium, such as a standard two-way FM radio 22. Transmitter 20 will typically be located at a remote location from the receiver (to be further discussed hereinafter) of the narrow band television system. For example, transmitter 20 may be used for surveillance to maintain security in places such as stores, museums, industrial sites and bands. Transmitter 20 may also be located in moving vehicles such as mass transit vehicles including buses and trains, taxi cabs, and even in boats or the like. Other remote applications may include the monitoring of industrial processes and the transmission of accident or crime scene information from remote sites to a central location. In many of the surveillance applications, the primary beneficial effect of the transmitter 20 will be its deterrent potential in preventing acts of violence or crime.

A closed circuit TV (CCTV) camera 24 continuously takes pictures of the scene or area to be monitored. A typical CCTV camera 24 has a horizontal resolution of about 650 lines. Normal closed circuit TV pictures contain about 525 discrete lines of continuous information. Complete television pictures are sent at the rate of about 30 per second and are composed of two interlaced fields, each of which is sent at about 60 fields per second. For example, the first field may contain the even numbered lines and the second field may contain the odd numbered lines. In a normal television receiver or monitor, the fields are scanned from left to right at a line rate of 15,750 lines per second with each line having a duration of 63.5 microseconds. Of this 63.5 microseconds, 52.0 microseconds carries video information and the remainder of the duration is used for sync and blanking.

The CCTV camera 24 may typically have 325 black-white cycles during the 52 microseconds alotted to each scan line for information. The maximum frequency that the camera 24 will send is therefore 325 cycles divided by 52 microseconds which equals 6.25 MHz. CCTV camera 24 therefore ordinarily requires about a 6.25 MHz bandwidth for transmission of its video signals.

On the other hand, the standard two-way FM radio 22, which has been the standard land-mobile link for several decades because of its simplicity of operation and good voice reproduction, typically has a bandwidth of about 3 KHz. Radio 22 can therefore accommodate frequencies up to 3 KHz which is more than adequate for voice. However, frequencies above 3 KHz are greatly attenuated, as required by the FCC in order to prevent RF "splatter" onto nearby channels. Normal FM practice limits the information for voice bandwidth from 300 Hz to 3 KHz, so that intelligibility can be enhanced and very low frequency tones can be used for selective calling and repeater access. Frequency modulation, moreover, inherently enables one to use the modulator to accept information inputs from almost DC to 3 KHz without effecting its splatter characteristics. The ability to nearly obtain a DC response means that the narrow band TV signal can be directly FM modulated onto the RF carrier. This eliminates the need to use subcarrier modulation, as would be necessary for single-sideband radio or for phone systems, where a DC response is not possible. Direct FM, therefore, allows an economical system in terms of hardware complexity and occupied bandwidth.

It will therefore be appreciated that most of the transmitter 20 operates as a bandwidth translator to couple the 6.25 MHz bandwidth requirements of CCTV camera 24 to the 3 KHz bandwidth limitations of FM radio 22. The bandwidth translation is achieved by two techniques. First, the images from CCTV camera 24 are rapidly read into and stored in a digital memory 26 at a fast rate compatible with the normal scan rate of the CCTV camera. The complete image stored in digital memory 26 is then later read out at a considerably slower rate on the order of 3 seconds per frame, as opposed to the 30 frames per second operation of CCTV camera 24. Secondly, the number of discrete picture elements (pixels) required to form a complete television image or picture has been reduced to 16,384 such that 128 lines of information including 128 pixels per line are provided. Higher resolution pictures could easily be sent over the 3 KHz bandwidth of FM radio 22 with a corresponding increase in transmission time. For example, a 256×256 image would require 12 seconds of channel time to transmit a frame.

The operation of transmitter 20 in taking one picture frame by CCTV camera 24 and sending of the same by a transmitter portion 22a of radio 22 is initiated by a receiver portion 22b of radio 22 receiving an identifiable or detectable digital word at antenna 28. The receiver portion 22b of FM radio 22 demodulates the FM signal received by antenna 28 and presents the demodulated digital word information to a so called ECHO detector 30. The digital words detected by detector 30 are two 23 bit words with a one-half bit in between the two words for a total of 46½ bits. Each of the 23 bit words contains 12 bits of code word and 11 bits of parity and error correcting information such that transmitter 20 may operate at a considerable distance from the receiver of the narrow band television system and yet the coded words may be detected by ECHO detector 30 in noisy environments with a low degree of falsing. Detector 30 preferably is an asynchronous sequential digital word detector such as the type disclosed in U.S. Pat. No. 3,855,576, issued to William V. Braun, et al on Dec. 17, 1974, which is assigned to the same assignee as the present invention. The teachings of U.S. Pat. No. 3,855,576 are incorporated herein by reference. ECHO detector 30 is preferably clocked by a clock 32 to provide good frequency stability relative to the receiver of the narrow band TV system, as will be further discussed hereinafter. The two code words used in the ECHO detecting arrangement provide for up to 400,000 remotely located transmitters and, therefore, provide very substantial expansion capability for adding additional remote transmitters to the narrow band TV system.

As can be seen from the timing diagram in FIG. 4, when the appropriate code words are detected by ECHO detector 30, the ECHO detector changes an output state on a line 33 to a peripheral interface adapter (PIA) 34. This rising waveform can be seen in waveform A of FIG. 4. PIA 34 then reacts to the ECHO detect, typically within 100 microseconds, and acknowledges the ECHO detect by transmitting an ECHO flip-flop reset signal, as seen in waveform B of FIG. 4, back to the ECHO detector 30 on a line 35 to reset an internal flip-flop in detector 30 such that the ECHO detect signal on line 33 and in waveform A of FIG. 4 again assumes a logic zero state. Line 35 is held at a logic zero state until the transmission has terminated such that any further paging signals at antenna 28 of radio 22 will not interrupt the transmission. At the same time, PIA 34 keys the transmitter portion of FM radio 22 to a transmit condition, as by controlling the push-to-talk (PTT) microphone switch of a typical FM radio. This is accomplished by sending the waveform C in FIG. 4 on line 37 from PIA 34 to the transmitter portion 22a of FM radio 22. A microprocessor 36 then begins sending a 3 KHz prefix pattern through the transmitter portion of FM radio 22 as can be seen in the initial portion of waveform F of FIG. 4. This 3 KHz prefix pattern is used by the transmitter portion 22a of the FM radio 22 to activate the transmitter oscillator to begin transmitting information since the FM radios marketed by Motorola, Inc. of Schaumburg, Ill. under the trademark MAXAR have an internal channel element associated with the transmitting oscillator which does not run at all times and some initial time is therefore required to condition the oscillator to begin transmitting information.

At the same time that the ECHO detector 30 is reset, PIA 34 instructs the taking of a picture or snap shot by generating the waveform D in FIG. 4 on a line 39 to a phase clock 40. Phase clock 40 thereupon causes a switch 42 to become closed such that the digital memory 26 begins receiving information from a latch 44 on 16 data lines, collectively identified by reference numeral 43. At the same time, phase clock 40 shifts the position of an electronic switch 46 which is actuated by a signal on a line 45 from phase clock 40 such that digital memory 26 begins receiving fast scan addresses from a fast scan address counter 48 via 12 address lines, collectively identified by reference numeral 47. Also at the same time, phase clock 40 by means of a read/write line 49 conditions the digital memory to begin writing information from data lines 43 into the memory.

Transmitter 20 is now ready to begin storing one complete picture frame from CCTV camera 24 into digital memory 26. Video signals from camera 24 on a line 51 may be corrected for contrast or brightness by a contrast and brightness control 52. Ordinarily, camera 24 will be provided with contrast and brightness controls which will suffice for most conditions. However, under extreme lighting conditions additional control over contrast and brightness may be desirable. The video signals are then presented by a line 53 to an amplifier means 54 to appropriately scale the video signals before presentation to an analog to digital converter 55. A/D converter 55 converts the analog video signals into four bit digital signals representative of 16 different gray levels of each video signal or pixel. The digitized video signals are then presented to a latch 56 by means of four data lines, collectively identified by reference numeral 57. The latch 56 is clocked by phase clock 40 by means of a line 58 to sample the output of A/D converter 55 at desired time intervals which will be related to the rate at which the video signals are being stored in digital memory 26. The output of latch 56, on four data lines 57 through a switch 58, is presented to a serial to parallel shift register 59 to convert the four bit digital samples into groups of 16 bits on 16 output lines 60. Register 59 is clocked by phse clock 40 on a line 61. At appropriate times, latch 44 is clocked by phase clock 40 by means of a line 62 to receive information from register 59 and temporarily hold the information for storage into digital memory 26 when the appropriate address is received from fast scan address counter 48. Conversion of the digitized video information from four bits at the output of latch 56 to 16 bits at the output of latch 44 also lowers the operational speed requirements of memory 26.

Pictures are thus stored in digital memory 26 by first sampling each scan line from camera 24 N times, then passing the samples into A/D converter 55. The quantized samples are then put into memory 26, whose size is determined by the number of samples per line (N), the number of lines (K) and the number of bits per sample (M). In a typical installation, there may be 128 samples per line times 128 lines times 4 bits per sample which requires a memory size of 65,536 bits. While 16 distinct levels of gray are obtained by using four bits per sample, finer gray scale resolution is possible with more bits per sample which will, of course, require a larger memory size. The memory 26 is filled within the normal CCTV camera 24 picture field time of one-sixtieth of a second.

If desired, the picture seen by the CCTV camera 24 may be displayed at the transmitter site on a TV monitor 65. A digital to analog converter 66 receives digital information from latch 56 on output lines 57 and converts the digitized information back to an analog signal. The analog signal from converter 66 has conventional television blanking and synchronization signals added by a blanking and sync circuit 67 which receives horizontal and vertical sync timing signals from a sync stripper 68 on respective output lines 69 and 70. The analog video signal with the blanking and sync signals is then buffered by a buffer 71 before being sent to TV monitor 65. The horizontal and vertical sync timing signals on lines 69 and 70 are also utilized by phase clock 40 and the vertical sync timing signal on line 70 is utilized by the fast scan address counter 48 in controlling the storage of the digitized viedo signals in digital memory 26 such that a complete picture frame is stored in memory 26 rather than portions of two different picture frames.

When MPU 36 has finished sending 350 milliseconds of a prefix pattern (waveform F in FIG. 4), the 46½ bits of the two word ECHO code, and 43 milliseconds of alternating ones and zeros in the form of a dotting pattern (the significance of which will become more apparent hereinafter), a phase reset pulse is generated by PIA 34 as shown in waveform E of FIG. 4. This phase reset pulse causes a two to one multiplexer 80 to select pixels from memory 26 in proper sequential order for transmission. A combination of the Lake Snapshot pulse (waveform D in FIG. 4) along with the vertical sync pulse on line 70 causes switch 42 to open as indicated in FIG. 1A and also causes switch 46 to close as indicated in FIG. 1B such that memory 26 begins receiving slow scan addresses from the MPU address bus 75 which is a part of MPU 36. MPU address bus 75 counts successive address locations in memory 26 such that memory 26 begins supplying the previously stored digital picture information at a considerably slower rate to a two to one multiplexer 76 via 16 data lines 77. Multiplexer 76 supplies this information in a multiplexed fashion on eight data lines 78 to MPU 36 since MPU 36 is an eight bit data processor. MPU 36 transmits the digital data to PIA 34 which in turn supplies the eight bit digital information to another two to one multiplexer 80 which further reduces the size of the data words to four bits which are presented to a latch 82. The four bits of digital information at latch 82 represent one discrete picture element or pixel which is converted by digital to analog converter 84 to one of the 16 gray levels indicated by the four bits of information. Converter 84 in turn supplies the analog video signal through a buffer 86 to the transmitter portion 22a of radio 22 which FM modulates the video signal and transmits it via an antenna 88.

Thus, memory 26 is read out for transmission by first reconverting the digitized pixels to their appropriate analog value, then serially sending the analog levels out, one pixel at a time. It should be noted that the time required for this analog transmission is not a multiple of the number of bits per sample, as would be the case in a digital transmission scheme. Thus, an arbitrarily fine gray scale resolution can be obtained at the expense of a slight picture degradation, due to noise, at low RF signal levels, and larger memory sizes.

A divider network 90 divides the clock frequency from a logic clock 92 into the appropriate clock frequencies for latch 82, multiplexer 80, PIA 34, and multiplexer 76. Thus, latch 82 operates at the normal clock frequency, multiplexer 80 and PIA 34 operate at one half the clock frequency since these circuit elements handle twice the digital data as latch 82 for each clock pulse, and multiplexer 76 operates at one fourth the clock frequency since it handles four times as much data as latch 82 for each clock pulse.

Transmitter 20 preferably also includes a gray scale generator 94 which may be switched by switch 58 to provide gray scale video information to memory 26. By so doing, the entire narrow band TV system can be tuned and calibrated for optimum gray scale operation.

It would be apparent to those skilled in the art that most of the elements shown as blocks in FIG. 1A and 1B are readily available as "off the shelf" items from a variety of vendors. For example, MPU 36 and PIA 34 are available under part numbers MC6800 and MC6821 from Motorola, Inc. in Austin, Texas. The reference to PIA pin numbers in FIGS. 4 and 5 are to the actual pin numbers of part number MC6821 which is an integrated circuit.

The block diagram of the receiver, generally designated 100, of the narrow band TV system is shown in FIGS. 2A and 2B. The main purpose of the receiver 100 is to convert the video signals received through the narrow band transmission medium into signals suitable for reconstructing and displaying the picture on a TV monitor, as at a base station. As previously discussed, the taking of a picture frame at the transmitter 20 of the narrow band TV system is initiated by a page, i.e. the sending of a recognizable ECHO signal, from the receiver base station 100. A microprocessor (MPU) 102 may be preprogrammed to initiate this page at predetermined internals. MPU 102 interfaces with a peripheral interface adapter (PIA) 104 and PIA 104 keys a transmitter portion 106a of radio 106 by means of a line 107 therebetween. The signal on line 107 is shown in the waveform G in FIG. 5. About one millisecond after transmitter portion 106a of radio 106 is keyed, PIA 104 generates an ECHO enable signal as seen in waveform H of FIG. 5. During the interval of the ECHO enable signal, MPU 102 generates the waveform I in FIG. 5 which is transmitted by PIA 104 to the transmitter portion of radio 106. The ECHO paging signal of waveform I is thereby sent or transmitted via an antenna 108 to the transmitter 20. The interrogation signal of waveform I may have a 43 millisecond prefix to condition an internal local oscillator of the receiver portion 22b of transmitter 20 to prepare for the 46½ bits of the ECHO code. As soon as transmitter 20 has detected its unique ECHO code, no further information is necessary since transmitter 20 will begin taking one picture frame as previously discussed. Also as previously discussed, transmitter 20 immediately begins to generate a coded preamble back to receiver 100 as shown in waveform F in FIG. 4, at the same time that video information is being stored in transmitter 20 for subsequent transmission to transmitter 20. Furthermore, and as previously discussed, the 340 millisecond prefix of waveform F in FIG. 4 is optional, depending upon the particular type of radio utilized at the receiver 100. Receiver 100 waits for an ECHO detector 112, which is similar to the previously discussed ECHO detector 30 in transmitter 20, to detect the correct ECHO code returned by transmitter 20. Assuming that the ECHO pattern is detected, PIA 104 will generate an ECHO flip-flop clear signal, as seen in waveform K in FIG. 5, on a line 109 to ECHO detector 112. Information from transmitter 20 is received by an antenna 114. This information is then demodulated by a receiver portion 106b of radio 106 and filtered by a filter network 116 which receives the demodulated information from a discriminator of the radio receiver. The filter information is then limited by a limiter 118 before being presented to ECHO detector 112. An accurate and stable clock 120 clocks the ECHO detector 112 at the same frequency as the clock 32 of transmitter 20. ECHO detector 112 signifies a properly detected ECHO sequence by outputting a pulse, as shown in waveform J of FIG. 5, to interrupt generator 110 and to PIA 104 via a line 121. PIA 104 thereupon enables a mode control line 123 of a digital phase locked loop (PLL) 124 such that PLL 124 becomes locked in phase with the 43 millisecond dotting pattern shown in part of waveform F of FIG. 4 and thereafter releases mode control line 123 such that PLL 124 will free run in the desired phase relationship during the 2.8 seconds in which transmitter 20 is continuously sending video information to receiver 100. This phase lock signal on line 123 is seen in waveform L in FIG. 5. As seen by waveform K in FIG. 5, the ECHO flip-flop clear signal will remain in a high state during the entire video signal transmission time to prevent an interruption of reception of the video signals at receiver 100. After transmission of the video signals has terminated, the echo flip-flop clear signal will return to a zero logic state. Since transmitter 20 has completed its function upon transmission of the video signals, transmission will terminate as shown in waveform F in FIG. 4 and the transmitter will remain idle until it is paged again by receiver 100.

Since state of the art FM radios, such as radio 106, frequently employ varactor FM modulation, it is commonplace to AC couple the transmitter portion 22a of radio 22 in transmitter 20 to avoid any DC biasing change of the varactor diode by the driving circuitry which could result in unwanted changes or instabilities in the transmitter frequency. On the other hand, at radio 106 it is desirable to DC couple the discriminator of the receiver portion of radio 106 to filter network 116. Any drift or offset in frequency between receiver of radio 106 and transmitter of radio 22 will result in a DC offset at the discriminator of radio 106. Since the signal provided by the discriminator is subsequently to be analog to digital converted, any DC offset will result in a change or shift in the gray intensity when the analog information is converted to digital form. It is therefore desirable in the amplifier scaling between filter 116 and an analog to digital converter 128 to provide circuitry to restore the DC level of the received analog signals to their proper level before the analog information is converted into digital form of an incorrect gray level. The eight bits of digital information provided at the output of A to D converter 128 are therefore converted back to analog form by a digital to analog converter 130 which provides a DC level to the DC restoration circuitry 126.

The DC restoration circuitry is shown in detail in the schematic diagram of FIG. 3. A D flip-flop 125 was previously set by memory switch waveform Q in FIG. 5 appearing on line 184 and inverted by inverter 117 to the set terminal of flip-flop 125. Output Q of flip-flop 125 is therefore at a logic zero level which renders a first transistor 142 conductive. A second transistor 143 is thereby also rendered conductive at the same time. Transistor 143 functions as a switchable integrator because of the capacitor 144 in its collector. Initially, there may be no signal to receiver 100 and hence to DC restoration circuit 126 except whatever noise level is present. However, when receiver 100 begins receiving the prefix pattern and ECHO code from transmitter 20 integration of the incoming signals from filter 116 begins to determine the offset. Because the video information will typically change slowly, it is desireable to integrate some other signals which will have an approximately equal number of logic one and zero levels and therefore an average DC level which can be used to determine the amount of DC offset in the discriminator or radio 106. The prefix pattern and ECHO code, as seen in part of waveform F in FIG. 4, are quite satisfactory signals from which the DC offset can be determined because the number of logic one and zero levels will be about equal and frequent logic level transitions also occur. The integration of the prefix pattern and ECHO code is terminated when the Phase Lock signal, waveform L in FIG. 5, appears on line 123 and, after inversion by an inverter 119, causes flip-flop 125 to be clocked. Clocking of flip-flop 125 causes the $\overline{Q}$ output to return to a logic one level and thereby renders transistors 142 and 143 non-conductive.

During integration an operational amplifier 148, which is connected as a voltage follower, buffers the analog level at capacitor 144 to an analog to digital converter 128 via a line 151. For example, the DC level on capacitor 144 and on line 141 can be selected to nominally be +5.0 volts for a 0 to 10 volt range of DC values. A/D converter 128 converts this analog level to an 8 bit digital representation. Since a DC level of 0 volts on line 151 would be represented by all logic zeros on the outputs of converter 128 and a DC level of 10 volts would be represented by all logic ones, an average value of 5 volts will be represented by the digital sequence 10000000. Inverter 129 converts the most significant bit (MSB) to a zero under no DC offset conditions such that a latch 127 receives all logic zeros. Latch 127 is therefore reset to the no DC offset level represented by the logic sequence 00000000.

Latch 127 was previously reset to all zero outputs which represents the no DC offset condition, when flip-flop 125 was set by the memory switch pulse on line 184. Similarly, when the Phase Lock signal on line 123 stopped the integration, latch 127 was also clocked to retain the then existing digital equivalent of the DC level on line 151. This digital level information will be retained and held in latch 127 for the entire video transmission of about 2.8 seconds since latch 127 will not be reset until the next Memory Switch pulse is again generated at the end of the video transmission.

D/A converter 130 converts the digital representation of the DC level of line 151 to an analog level after an inverter 131 first restores the MSB to the logic value at the MSB output of the A/D converter 128. A commercially available D/A converter has, however, an output analog swing of only 0 to 1.0 volts. A 10000000 input digital sequence therefore yields a 0.5 volt output on output line 133.

An operational amplifier 134 receives the analog level on line 133, which it should be noted will also be held at the level corresponding to the digital information in latch 127 for the entire video transmission. Amplifier 134 is designed for unity gain, but since line 133 is connected to the inverting input, the output of amplifier 134 will nominally be −0.5 volt for no DC offset. Calibration means in the form of an adjustable resistor 135 is provided in the feedback path of amplifier 134 to provide a gain adjustment for DC restoration circuit 126.

The output of amplifier 134 is fed to a non-inverting input of another amplifier 136. Amplifier 136 is designed to have a gain of about 2.5 and therefore the nominal DC level at the output of amplifier 136 is −1.25 volts. A potentiometer at the inverting input of amplifier 136 provides a DC offset or zeroing adjustment for circuit 126.

A double-pole single-throw switch 137 is connected in series with the output of amplifier 136 and an inverting input of another amplifier 132. When one pole 138 of switch 137 is closed as shown in FIG. 3, the other pole 139 will be normally open and amplifier 132 will receive the correcting or compensating offset voltage from amplifier 136. When switch 137 is in the opposite state, pole 138 will be open and pole 139 will be closed such that amplifier 132 may optionally receive a manually adjustable offset voltage from a potentiometer 140.

Amplifier 132 is designed to have a gain of about 4. Since the output of amplifier 136 is connected to the inverting input of amplifier 132, the output of amplifier 132 will nominally be at +5.0 volts which, as previously discussed, is also the nominal DC levels on the terminal of capacitor 144 connected to amplifier 148 and on line 151.

Once the DC offset of radio 106 has been determined and a compensating offset voltage has been established in DC restoration circuitry 126, the video signals pass in sequence through amplifier 132, amplifier 148 and A/D converter 128. While converter 128 is an 8 bit converter for purposes of DC restoration, only the 4 most significant bit outputs are used for the analog to digital converted video signals, since, as previously discussed, only 16 gray levels are of interest. These 4/MSB bit outputs of converter 128 are then routed to a serial/parallel register and latch 152 as indicated in FIG. 2B.

When the dotting period has ended and video data is to begin, PLL 124 provides an accurate sampling signal of about 6 KHz on a line 149 to a start pulse generator 150. Start pulse generator 150 sends sampling pulses to A to D converter 128 to accurately control the sample time of converter 128 in sampling the analog video signals to be converted to digitized form. A serial to parallel resister and latch 152 receives the four digital bits of each converted pixel and converts gros of four pixels (16 bits) and outputs the 16 bits on 16 output lines, collectively referred to by reference numeral 153. A double-pole double-throw electronic switch 154, which may be implemented as a multiplexer, applies the 16 bits of video information from register and latch 152 to either memory 156 or 158 depending upon the state of switch 154. For example, assume that information from register and latch 152 is being stored into memory 156. Another double-pole double-throw switch 160 is operated in conjunction with switch 154 such that a slow scan counter 162 will supply slow count addresses to memory 156 such that successive 16 bit words from register and latch 152 may be stored in successive memory locations in memory 156. As soon as memory 156 is filled with one video picture frame, switches 154 and 160 together change state such that memory 156 now receives fast scan addresses from a fast scan counter 164. At the same time, a read-write line 157 to memory 156 changes state so that memory 156 is in a read mode and the information previously stored in memory 156 is read out to a parallel to serial register 166. Also at the same time, any new video information received by radio 106 is read into the second memory 158 at the slow scan rate determined by counter 162. Parallel to serial register 166 converts the parallel 16 bit words from memory into separate four bit data words, each representative of one of 16 gray levels in an analog pixel. A D to A converter 168 converts each four bit data word into the corresponding analog level. A blanking circuit 170 adds blanking signals to the analog signals from converter 168 and a horizontal and vertical sync circuit 172 receives horizontal and vertical timing signals on respective lines 173 and 174 to add horizontal and vertical sync signals to the analog and blanking signals to provide a complete TV signal, after buffering by buffer 176, to drive a TV monitor 178 to supply one picture frame previously taken by CCTV camera 24 in transmitter 20. It will be understood that memory 156 will continually be reread for successive frames of the same information stored in memory 156 while memory 158 is slowly being filled with a new or updated video frame. When the fast scan counter 164 reaches the last address in memory 156, fast scan counter 164 automatically resets to the first memory address and begins counting again. Fast scan counter also provides the horizontal and vertical timing signals on respective lines 173 and 174.

PIA 104 supplies a slow counter clear pulse as shown in waveform M in FIG. 5 on a line 180 to slow scan counter 162 at the end of the phase lock pulse shown in waveform L, which is just prior to receiving the beginning video data. Thereafter, slow scan counter 162 is clocked by PIA 104 and a line 181 in the manner shown in waveform N in FIG. 5. At the same time, PIA 104 is supplying memory write pulses as shown in waveform P in FIG. 5 on a line 182 to a memory controller 183 which routes the write pulses to whichever memory 156 or 158 is currently receiving information from radio 106 under the influence of slow scan counter 162. When 16,384 four bit video samples have been stored in one of memories 156 or 158, PIA 104 generates a memory switch pulse as shown in waveform Q in FIG. 5 on a line 184 to the memory controller 183. Memory controller 183 thereby controls the states of the electronic switches 154 and 160 by means of an output line 186 such that the switches 154 and 160 simultaneously change state. This switched memory arrangement permits storage of one complete picture frame in a memory before the memory is subsequently read out for display on TV monitor 178 such that successive complete frames are displayed on TV monitor 178 rather than continuously updating the image to the TV monitor which results in an unsatisfactory overlapping of two different picture frames.

The frequency of a master clock 188 is divided by a divider network 190 to provide two output clock frequencies, a first clock frequency which PLL 124 utilizes in producing an accurate 6 KHz phase locked output and a second clock frequency of about 3 MHz on a line 192 to fast scan counter 164. It can thus be appreciated that the difference between the fast and slow portions of the video circuitry differ by a factor of 500. An inverted 3 MHz clock signal is also provided by divider network 191 to parallel to serial register 166 on a line 193.

In accordance with another aspect of the present invention, means are provided for permanently storing, in a stop action manner, a frame of interest on a second television monitor 196. To this end, a third memory 198 continuously receives fast data information through an I/0 buffer 197 from one of the memories 156 or 158 on a 16 bit data bus 199 which also provides fast scan data information to parallel to serial register 166 associated with TV monitor 178. Memory 198 also continuously receives fast scan addresses from fast scan counter 164 on a 12 bit address bus 200. For example, a manually operable switch 202 or the like, in the read/write line of memory 198 may be closed to continuously write information into memory 198. When it is desired to permanently display a selected frame on TV monitor 196, switch 202 is opened to cause memory 198 to be in a continuous read mode. Memory 198 will then continuously supply the picture frame stored therein through I/O buffer 197 on 16 data lines, collectively referred to by reference numeral 201, to a parallel to serial register 204 to convert the parallel information supplied by memory 198 into a four bit data word to a digital to analog converter 205. Converter 205 converts successive four bit data words into an analog signal of one of 16 levels representative of the gray level of the associated pixel. A blanking circuit 206 adds a blanking signal to the analog signal from converter 205 and a horizontal and vertical sync signal 207 adds horizontal and vertical sync signals under the influence of timing signals from fast scan counter 164 on lines 173 and 174 to provide a composite TV signal to a buffer 208. Buffer 208 supplies the reconstructed video information in a form suitable for display on TV monitor 196.

The advantage of the dotting pattern in synchronizing the PLL 124 to the desired phase relationship to accurately sample the video information can be further appreciated from the waveforms seen in FIG. 6. Waveform R represents an analog video signal wherein the analog video signal is continuously changing in successive pixels between gray levels. As previously discussed, the video information is transmitted at a rate of about 6 kilo-samples per second. However, as also previously discussed, radio 106 only has a bandwidth of about 3 KHz. The analog video signal in waveform R in FIG. 6 is therefore low pass filtered by the radio circuitry in compliance with FCC splatter regulations. The video signal as provided by the discriminator of radio 106 will therefore be significantly changed from the original video analog signal as can be appreciated from the approximately sinewave waveform S in FIG. 6. It can therefore be readily appreciated that changes in the phase of sampling of the received video waveform in waveform S can result in significant differences in gray level determinations by the analog to digital converter 128. For example, if the sampling occurs at the midpoints of each of the video samples in waveform R, the waveform S will have about equal magnitude at each sample point even though the transmitted video signal in waveform R had greatly alternating intensities. On the other hand, if sampling occurs on the rising edge of the sampling pulse of waveform T it can be seen that the magnitude of the successive samples of waveform S will be closely related to the transmitted analog levels seen in waveform R. Of course, if the video information is sent at a lower rate compatible with the bandwidth requirements of the radios 22 and 106, the attenuation and low pass filtering effects seen in waveform S will not occur. However, a correspondingly greater time will be required to transmit one complete picture frame and therefore there will be correspondingly greater time intervals between updating of the picture frames on the TV monitor 178 at receiver 100.

Of course, it will be understood from the foregoing that the dotting pattern no longer exists when the video samples are being received since the dotting pattern preceded the video samples. As can also be seen from FIG. 6, the received analog video samples are phase shifted because of the low pass filtering effects of filter 116 (FIG. 2A) such that the zero crossings of the received video sample fall in the middle of the original video signal from CCTV camera 24. PLL 124 tends to follow these zero crossings during the falling edge of the PLL cycle such that the rising edge of the PLL waveform, and hence the A/D converter sampling pulse which is derived from PLL 124, automatically points to the best sampling times for the video waveform S in FIG. 6. That is, the rising edges of sampling waveform T will point to the peaks and valleys in waveform S which most closely approximate the video information in original video waveform R.

While the dotting pattern method of synchronizing the sampling of data in A to D converter 128 (FIG. 2A) will be satisfactory for most installations, another type of synchronization is shown in the block diagram of FIG. 7 and in the associated signal diagram of FIG. 8. The synchronization circuit of FIG. 7 is preferable over the dotting pattern synchronization method since the synchronization circuit of FIG. 7 not only achieves good sampling synchronization but also, and more importantly, points to the first video sample. As previously discussed, the ECHO detect system to identify picture interrogation requests from receiver 100 and to also identify transmissions from transmitter 20 to receiver 100 are quite satisfactory in high noise environments since the ECHO system uses two words each containing twelve data bits and eleven parity bits such that any errors in the data bits can be detected and corrected. However, the ECHO detector uses a CMOS type logic implementation of a data sampler which causes the ECHO detector to be fairly slow in comparison to the desired video transmission frequency. For example, the ECHO detector permits data rates of only less than 1500 bits per second and typically operates better at about 750 bits per second. On the other hand, as previously discussed, it is desirable to transmit video information at about 6000 samples per second to be able to update transmitted picture frames in about 3 seconds. Therefore, due to the slowness of the CMOS logic in the ECHO detector, when the correct code words are identified, the detect signal from the ECHO detector is not very sharp with respect to data which is being transmitted at eight times the typical ECHO frequency. This problem is further aggravated when higher data bits are used, for example, in transmitting video signals over digital voice privacy (DVP) type radios having bandwidths that would allow about 12 kilo-samples per second transmission. The video information can then easily be transmitted at 12,000 samples per second which is 16 times the rate of data in the ECHO detector. The ECHO detect signal then is too slow to be an accurate pointer to the first video sample.

These detect problems can be overcome by combining the lower speed ECHO detector with a high speed 11 bit Barker word detector in order to provide a high speed and reliable detection of the first video sample and also to provide reliable operation in noisy environments. A Barker word has the property that the correlation with itself is virtually zero until the Barker words are exactly matched in phase, i.e. the Barker word has a highly peaked autocorrelation function.

Serial data of the form shown in FIG. 8 is input from limiter 118 of FIG. 2A into a serial shift register 210. Shift register 210 is of sufficient length to store a complete Barker word therein. Precoded combining logic 211 samples each of the bits of register 210 to recognize the Barker word as by precoded logic, or by comparison with a Barker word stored in memory. If shift register 210 contains the Barker word, combining logic 211 outputs a signal on an output line 212 to a flip-flop 213, the output of which resets a free running counter 214. Since counter 214 is clocked from the sample clock from divider network 190 via line 191, counter 214 continues to free run at the data transmission frequency.

As can be seen from FIG. 8, N subsequences (not all of which are shown) of K times M bits precede the first bit of the ECHO word. Each of these M identical subsequences contains an 11 bit Barker word. For example, at a 12 kilosample per second video transmission rate, each subsequence can be of 16 bits in length and be of equal transmission time to a single 750 bits per second ECHO bit. The counter 214 is also selected to be of length K times M such that it assumes an all zero state on the next count after K by M. It will therefore be appreciated that while there are M subsequences each containing a Barker word that the synchronization circuitry in FIG. 7 need only detect one of the Barker words since once a Barker word is detected the counter will automatically reset itself to an all zero state at the end of each K times M bits.

Note that the synchronization circuitry of FIG. 7 requires that all 11 bits of the Barker word be correct in order for there to be a detection of the Barker word to reset counter 214. Thus, although some of the Barker words may go undetected due to bit errors in a noisy environment, it is likely that at least one of the Barker words in one of the N sequences will be detected prior to transmission of the first ECHO bit. Once there is an ECHO detect during transmission of the last ECHO bit, even though the ECHO detection may not be sharp relative to the higher speed data, the next all zero state of counter 214 will point to the first data bit with a high degree of accuracy. Thus, a greatly improved time reference is provided for the start of the data or video signals without much complexity in hardware and with relatively inexpensive logic components.

In view of the foregoing it will now be appreciated that certain bits of the ECHO code or unused K times M bits in which the Barker word is contained may be used for various control functions. For example, the number of gray scales could be increased or decreased from 16. Also, the transmitted picture frame could be changed from 128×128 pixels to 256×256 pixels for improved resolution in the received picture. This assumes, of course, that adequately sized address buses and memory are provided.

While particular embodiments of the invention have been shown and described, it will be obvious to those skilled in the art that changes in modifications may be made without departing from the invention in its broader aspects, and, therefore, the aim of the appended claims is to cover all such changes and modifications as fall within the true spirit and scope of the invention.

I claim:

1. An asynchronous information transmission system comprising:
   a transmitter and a receiver, said transmitter adapted to transmit information to said receiver, and said receiver adapted to receive information from said transmitter, said transmitter including:
   code word generating means for generating at least one code word at a first predetermined bit rate to enable identification of said transmitter at said receiver, the bit rate of the code word being significantly slower than the bit rate of the transmitted information which follows the code word; and
   preamble generating means for generating a preamble at a higher bit rate than said code word, said preamble having peaked autocorrelation properties;
   said receiver including:
   code word detecting means to detect said at least one code word to enable said receiver to identify said transmitter; and
   preamble detecting means to detect said preamble with peaked autocorrelation properties to accurately point to the start of said transmitted information.

2. The asynchronous information system as defined in claim 1 wherein said higher transmission rate of said preamble generating means is an integer multiple of said first predetermined information transmission rate of said code word generating means.

3. The asynchronous information system as defined in claim 2 wherein said integer multiple is equal to or greater than the ratio of number of bits in the preamble to one bit of said code word.

* * * * *